United States Patent
Sayed et al.

(10) Patent No.: US 7,902,691 B2
(45) Date of Patent: Mar. 8, 2011

(54) ENHANCED CIGARETTE LIGHTER ADAPTER

(75) Inventors: Ashley Sayed, London (GB); Lucien Groenhuizen, Almere (NL)

(73) Assignee: TomTom International B.V., Amsterdam (NL)

( * ) Notice: Subject to any disclaimer, the term of this patent is extended or adjusted under 35 U.S.C. 154(b) by 483 days.

(21) Appl. No.: 11/907,254

(22) Filed: Oct. 10, 2007

(65) Prior Publication Data

US 2009/0097221 A1 Apr. 16, 2009

(51) Int. Cl.
*B60L 1/00* (2006.01)
(52) U.S. Cl. .......................................... 307/9.1
(58) Field of Classification Search .................... 307/9.1
See application file for complete search history.

(56) References Cited

U.S. PATENT DOCUMENTS

| | | | | |
|---|---|---|---|---|
| 6,143,228 A * | 11/2000 | Jones | ............................ | 264/295 |
| 6,230,029 B1 * | 5/2001 | Hahn et al. | ................. | 455/575.2 |
| 6,752,649 B2 * | 6/2004 | Arkin et al. | .................... | 439/491 |
| 7,019,967 B2 * | 3/2006 | DiFonzo et al. | ......... | 361/679.52 |
| 2002/0198031 A1 * | 12/2002 | Holmes et al. | ................ | 455/569 |
| 2005/0054400 A1 | 3/2005 | Seick et al. | | |
| 2006/0234536 A1 * | 10/2006 | Kuan et al. | ..................... | 439/159 |
| 2006/0276236 A1 * | 12/2006 | Krieger et al. | ................ | 455/573 |
| 2007/0035629 A1 * | 2/2007 | Braunstein et al. | ...... | 348/207.99 |
| 2007/0171091 A1 * | 7/2007 | Nisenboim et al. | ...... | 340/825.69 |
| 2007/0178877 A1 | 8/2007 | Pemble et al. | | |
| 2007/0179702 A1 | 8/2007 | Pemble et al. | | |

* cited by examiner

*Primary Examiner* — Jared J Fureman
*Assistant Examiner* — Dru M Parries
(74) *Attorney, Agent, or Firm* — Harness, Dickey & Pierce, P.L.C.

(57) ABSTRACT

A cigarette lighter adapter (CLA) is disclosed comprising a body and a barrel portion extending therefrom, said barrel portion including a first and second contacts respectively connectable within a vehicle cigarette lighter to be powered therefrom, said CLA being additionally provided with at least one primary electronic circuit within the body thereof, connected directly or indirectly to said contacts, and an output to which a power signal is capable of being delivered. The CLA is characterized in that it includes an antenna component in electrical communication with said primary electronic circuit, the latter delivering at least one of the antenna signal, a electronically processed version thereof, or data derived from the electronic processing thereof, to said output in conjunction with said power signal, the source of which is derived from said contacts or from an alternative power source provided within the body of said CLA, such as an on-board rechargeable battery, said power signal source further providing power to said primary electronic circuit to enable operation thereof. Further features include the provision of one or more secondary electronic circuits within the CLA to provide power management, regulation, control, switching, and/or battery re-charging functions, and the segregation of the primary and secondary electric circuits so as to ensure effective heat dissipation. Most preferably, the CLA is provided with vents adjacent which at least one of the secondary electronic circuits is provided.

24 Claims, 8 Drawing Sheets

ENHANCED CIGARETTE LIGHTER ADAPTER

SUMMARY OF THE INVENTION

This invention relates to an enhanced cigarette lighter adapter (CLA) in which electronics are provided which may be powered from a vehicle having a cigarette lighter. More specifically, the present invention relates to an enhanced CLA having electronics therein and which is capable of communicating with in-car apparatus, either wirelessly or through a wired connection thereto.

BACKGROUND OF THE INVENTION

The use of CLAs to provide power to a wide variety of apparatus is known. Typically, such CLAs are provided with a body portion and a barrel portion on which are provided the electrical contacts. A first contact pin protrudes from the end of the barrel portion, and one or more second contacts are provided on the cylindrical periphery of the barrel portion such that when the CLA is inserted into the cigarette lighter of a vehicle, an electrical circuit, including whatever electronics are provided inside the CLA, is completed, and power can be drawn from the vehicle battery. Usually, vehicle batteries provide a 12V DC power source, whereas the majority of electronic apparatus which might be used in a car will require slightly different, albeit still low, voltage. Examples of apparatus include laptop computers, in-car DVD players, mobile telephones, and in-car or portable navigation devices, with which this invention is primarily concerned. Power is provided to the apparatus by means of a cable which is electrically connected internally to the electronics inside the CLA, and which emerges from the rear or side of the body of the CLA, ultimately terminating in a suitable connector.

Personal navigation devices or PNDs are being widely adopted by drivers and owners of vehicles throughout the world. The navigation assistance provided by such devices is facilitated by on-board processing equipment which accurately (within about 10 m) determines the position of the PND on the surface of the earth, and associates that position with digitized map data provided in memory accessible to the PND, usually either in a small memory card, or on-board RAM or ROM. As is known, PNDs can receive user input of a desired destination in a variety of ways, whereupon the PND calculates a best route according to various algorithms and user requirements and then displays a relevant portion of a map along with a route to be navigated. Typically the PND will include an internal battery, but as most PNDs include a display screen for real-time display of map data as the vehicle moves, they are relatively power-hungry devices and can only be used on battery power alone for short journeys.

CLA adapters which provide power for PNDs, and for re-charging the batteries within them, are known. Currently, CLAs are aftermarket accessories which provide only power to the PND thereby having limited market value, especially when competing with home chargers and other charging devices. Accordingly, a need exists in the art for a more cost effective, functional and consumer-appealing CLA.

Published US patent application US2005/0054400 discloses a CLA which is in the traditional form having a barrel portion with contacts and a body. Within the body there is further provided a first circuit for power management, regulation, and delivery to a first output, and one or more further circuits, powered from the contacts, capable communicating in a wireless local area network (WLAN). An antenna is further provided in the body, the signal from said antenna being delivered to the WLAN circuitry, a separate output for which is also provided. Both outputs are in the form of two or more cables emerging from the rear of the body of the CLA, for separately providing a recharging power source, and telecommunications data derived from the signal received by the antenna within the device.

SUMMARY OF THE INVENTION

According to the present invention there is provided a CLA comprising a body and a barrel portion extending therefrom, said barrel portion including a first contact in the form of a pin protruding from one end and one or more second contacts being provided elsewhere thereon, said CLA being additionally provided with at least one electronic circuit within the body thereof, connected directly or indirectly to said contacts, and an output to which a power signal is capable of being delivered, And characterized in that The CLA includes an antenna component in electrical communication with said electronic circuit, the latter delivering at least one of:

the antenna signal, a electronically processed version thereof, data derived from the electronic processing thereof to said output in conjunction with said power signal, the source of which is derived from said contacts when disposed within a live vehicle cigarette lighter or from an alternative power source provided within the body of said CLA, said power signal source further providing power to said electronic circuit to enable operation thereof.

Preferably, the alternative power source is in the form of a (preferably) rechargeable, battery, such as a Lithium Ion battery, a nickel-metal-halide battery, or the like.

In a preferred arrangement, the electronic circuit also includes recharging electronics which are capable of recharging the battery when a source of power is being provided through the contacts from a live vehicle cigarette lighter.

In an alternative arrangement, the CLA includes a secondary electronic circuit, which is also directly or indirectly connected to said contacts, as well as to the battery, such being adapted to affect a recharging function on said battery when a source of power is being derived from said contacts.

In a most preferred arrangement, the CLA further includes a voltage switching regulator, which may be included in or be separate from the secondary electronic circuit.

In a most preferred arrangement, the electronic circuit is a wireless telecommunications processing circuit, for example capable of processing at least one of the following telecommunications standards or protocols: GSM, GPRS, EDGE, HSDPA, CDMA, WCDMA, WiFi, WiMax, BLUETOOTH. Most preferably, the electronic circuit is a wireless modem.

Preferably, the CLA output is a cable in electrical communication with said electronic circuit.

Most preferably, said CLA is provided with one or more LEDs indicative of one of the charging of the battery, the existence of a source of power for the CLA from a live vehicle cigarette lighter, and the processing of signals received by the antenna.

Preferably, the CLA is provided with at least two LEDs, preferably of different colours, a first LED providing an indication of the existence of a source of power for the CLA, and a second LED for providing an indication of the processing of signals received by the antenna.

In a preferred arrangement, the electronic circuit is capable of amalgamating the antenna signal, an electronically processed version thereof, or a data signal derived therefrom, with said power signal, and delivering both in conjunction to said output.

In a most preferred arrangement, the electronic circuit is a quad- or tri-band GPRS modem which is capable of extracting traffic congestion data from the signal received by the antenna, and the output is a serial output, such as a USB socket or cable, or a UART socket or cable, any of which can be used to deliver both power and data to a portable navigation device.

By providing the antenna and associated processing electronics in the CLA, the GPRS modem and related elements may be removed from the PND thereby saving engineering and manufacturing costs along with providing the industrial designer with fewer components to squeeze into the PND thereby opening the PND to other designs.

In a further preferred embodiment, a subscriber identity module (SIM) card connector is provided, in electrical communication with said electronic circuit whereby the CLA can automatically subscribe to, and thus process received wireless signals from a particular mobile telecommunications service provider when a suitably enabled SIM card is present in said connector.

In a preferred arrangement, the modem is capable of establishing a wireless connection using at least one of a subscriber identifier (IMSI), a modem identifier (IMEI), and an identified of a PND (PND UID).

In a further preferred arrangement, the CLA further includes power control electronics.

Most preferably, the antenna is a substantially flat component affixed to the inside surface of a part of the body of the CLA.

In a particularly preferred embodiment, the CLA is provided with vents in its body through which hot air, generated as a result of contact with the hot-working electronic circuit (s) and other electronic circuits can escape.

Most preferably, the CLA includes a first electronic circuit which receives a signal from the antenna, and one or more second electronic circuits for providing at least one of power management, regulation, switching and recharging functions, wherein at least one of the second circuits is separate from the first electronic circuit but in electrical communication therewith, and wherein said one or more second electronic circuits is disposed proximate to the vents provided in the body of the CLA.

Most preferably the vents are provided toward the front of the body of the CLA, with the battery, first electronic circuit, and optional SIM connector being provided towards the rear of the body, remote from the barrel portion. This arrangement is advantageous because the power management, regulation, switching and recharging functions which the CLA may have, are performed by the vented electronic circuitry, such functions (and circuitry) typically generating far more heat than the first electronic circuitry which processes the antenna signals. Accordingly, this segregation is an efficient and safe arrangement of components within the CLA.

In a most preferred arrangement, the one or more secondary electronic circuits is provided on a pair of PCBs disposed adjacent to one another inside a forward portion of the body of the CLA, each said PCB being additionally disposed proximate to a vent on the outside of the CLA.

BRIEF DESCRIPTION OF THE DRAWINGS

A specific description of the invention will now be described by way of example, with reference to the following drawings.

DETAILED DESCRIPTION OF THE INVENTION

Figure 1:
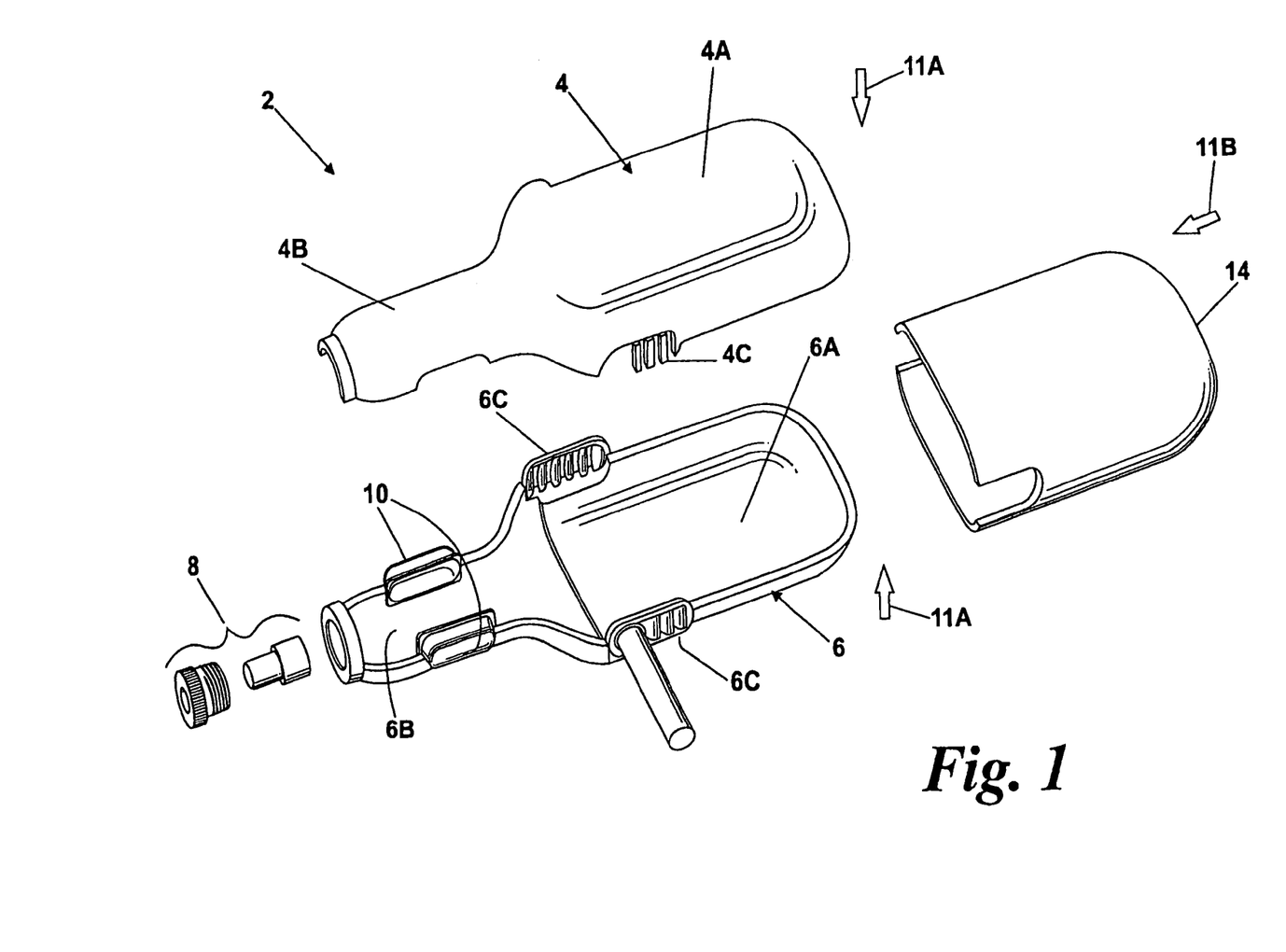
FIG. 1 shows an exploded perspective view of a CLA of a type suitable for use with the present invention.

Referring firstly to FIG. 1, there is shown a CLA generally indicated at 2 consisting of respective upper and lower casing halves 4, 6, each having a body part 4A, 6A and barrel part 4B, 6B. Together the casing halves, when assembled define a body with a cavity in which the electronics of the CLA may be provided, and a barrel part in which a first contact 8 and second contacts 10 are, usually springingly, mounted, and connected in turn through a fuse 12 (shown in FIG. 2B) to the electronics of the device.

Assembly of the CLA is completed in stages, with the various components being inserted into one or both of the casing halves and electrically connected together, whereupon the casing halves are brought together in snap-fitting manner as indicated by arrows 11A, and finally a cover 14 is slid axially as indicated at 11B over the assembled casing halves to encapsulate the majority of the body of the CLA therein. As can be seen from the figure, each casing half is provided with vent formations 4C, 6C which cooperate or otherwise interengage when the casing halves are brought together to define vents through which hot air generated inside the CLA during operation can escape. It is also worth mentioning, and advantageous, that the vents are provided opposite one another so that air can flow through the device in a most direct manner possible.

Figure 2A:
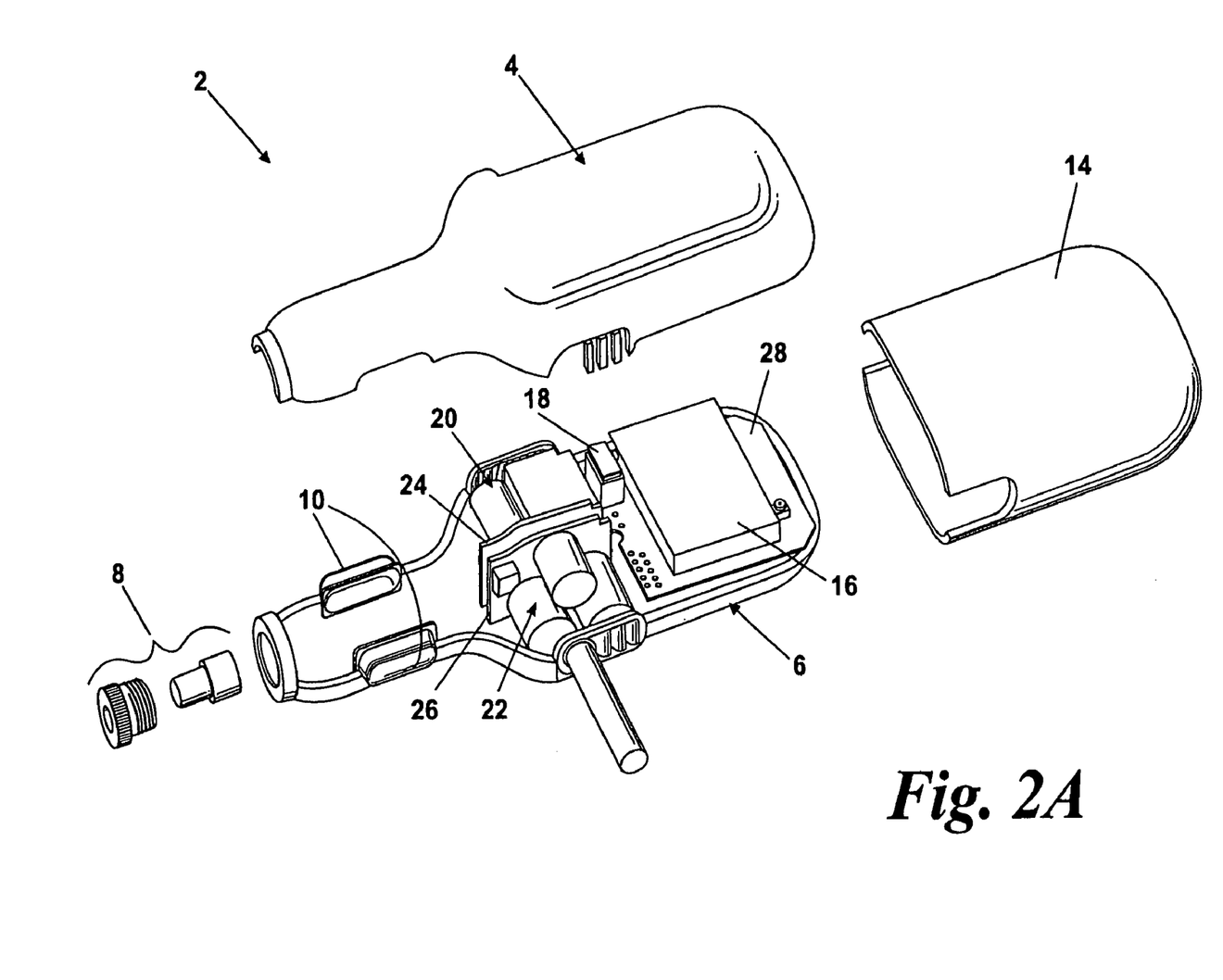
FIGS. 2A, 2B show different perspective views of the CLA of FIG. 1 to which components have been added, FIG. 3 provides a schematic circuit diagram of a CLA of the present invention.
Figure 2B:
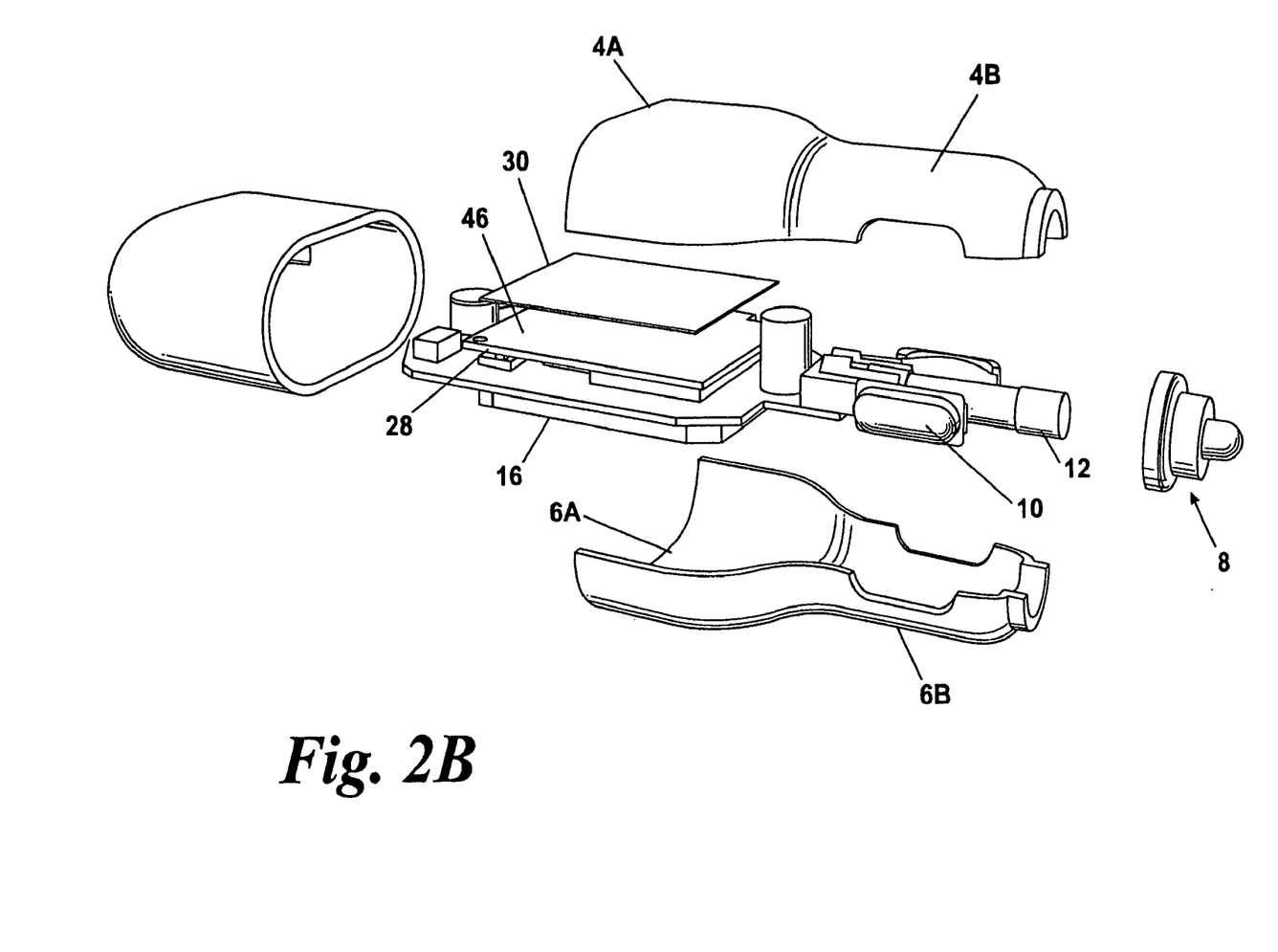
Figure 4:
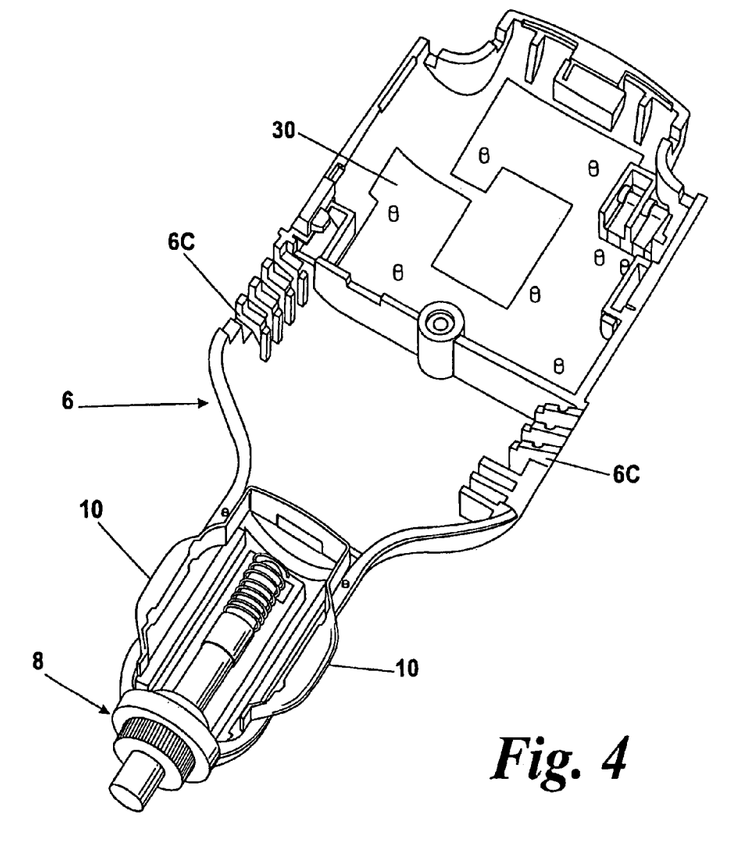
FIG. 4 shows a perspective view of a CLA having an antenna therein.
Figure 5:
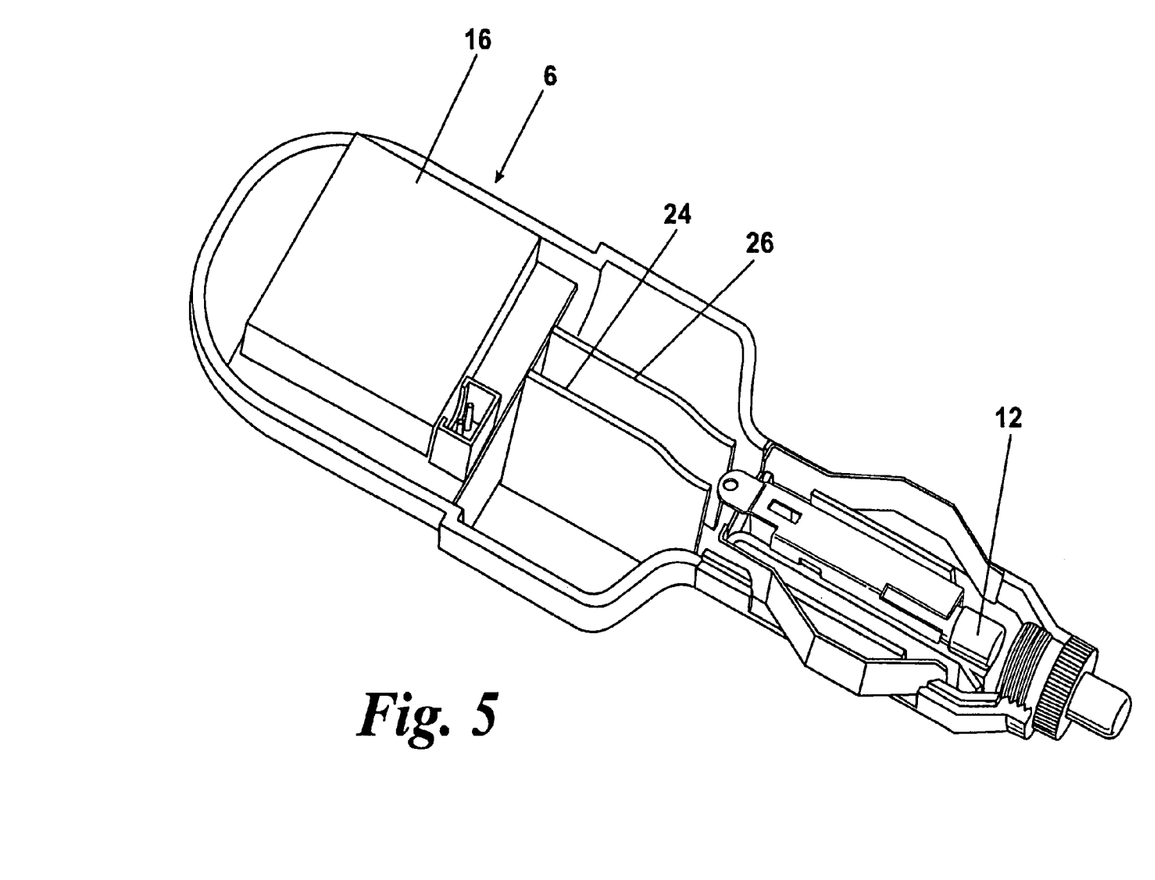
FIG. 5 shows a perspective view of the CLA of FIG. 4 in partially assembled state.

As can be seen from FIG. 2A, a rechargeable battery 16 is provided with an associated connector 18, which is in electrical communication with one or more secondary electronic circuits 20, 22, which in this embodiment are mounted on separated but adjacent printed circuit boards (PCBs) 24, 26 respectively. Such secondary electronic circuits provide such functions as power management, control, switching, regulation, and re-charging. Additionally, the battery 16 and associated connector are also mounted on a suitable PCB 28, beneath which is mounted a substantially planar antenna 30, as shown in FIGS. 2B and 4.

Figure 3:
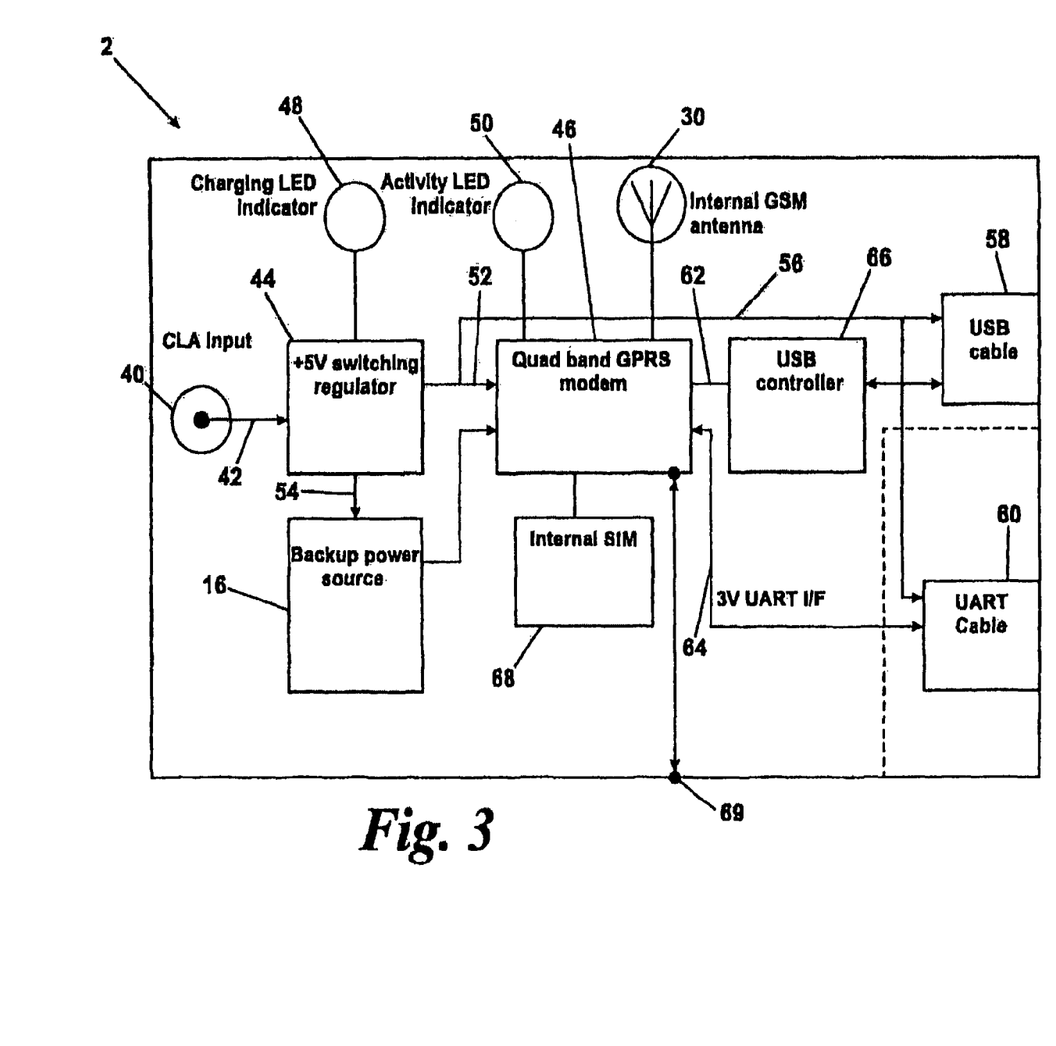

Referring now to FIG. 3, a schematic block diagram is provided of the components provided within CLA 2 of the present invention. The on-board battery 16 is shown, and the contacts are schematically represented at 40, the source of power derived therefrom being represented at 42 and feeding a switching regulator 44 which operatively reduces the traditional DC car battery voltage from 12V DC to 5VC DC. A quad band GPRS modem or other wireless telecommunications processing device is provided at 46, and both regulator 44 and modem 46 are connected to LEDs 48, 50 respectively, which are ideally of different colours and demonstrate the charging of the battery 16 and/or power supply through the contacts 42 on the one hand, and the processing activity of the modem 46 respectively. It is to be noted that the voltage regulator is in electrical communication with both modem 46 and battery 16 at 52 and 54 respectively, and is capable of providing a source of power to both. Furthermore, the output of the regulator 44 is also, in this embodiment, directly coupled at 56 to both a USB cable output 58 and optionally a conventional UART (universal asynchronous receiver/transmitter) cable output 60.

It should be mentioned that the presence of both a USB cable output and a UART cable output is unlikely to ever be implemented in practice as only one of these outputs is likely ever to be required, but the Figure demonstrates the possibilities for connection. Additionally, it should be mentioned that in the embodiment shown, a power signal is fed directly from the regulator 44 to both—in an alternative embodiment, the modem 46 may additionally include basic power management and/or transfer functions such that the direct connections 56 are not required, a power signal being delivered to outputs 58, 60 in conjunction with the data signals complying with the particular communications standards. Such signals are provided by the modem 46, at 62 or 64 as the case may be, and in the case that a USB cable output is provided, an additional USB controller 66 may be provided to ensure USB signals comply with the USB communications standard.

A SIM module 68, capable of receiving a conventional SIM card, is provided in communication with the modem 46 for enabling subscription to a particular wireless telecommunications network provided by a service provider by whom the SIM card is issued, and of course, an antenna 30 provides a means for collecting wireless signals being transmitted through space, said antenna again communicating with said modem 46 to deliver a useful signal thereto. Additionally, a reset facility in the form of a switch 68 or the like which causes a soft and/or hard reset of the modem 46 may be provided. Such facility may also be extended to the regulator 44 if required.

Figure 6:
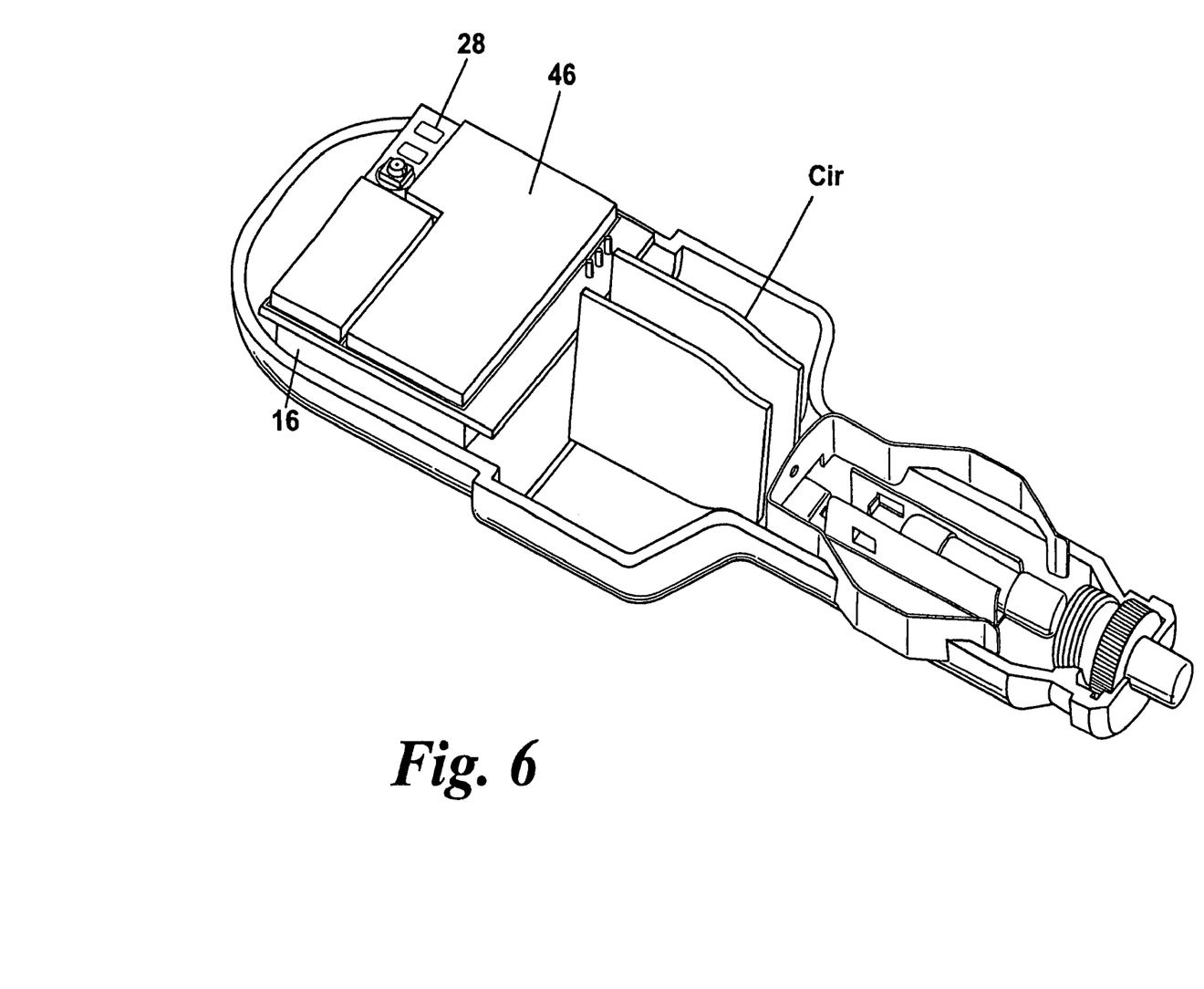
FIG. 6 shows the CLA of FIGS. 4 and 5 in a further assembled state.

Referring to FIG. 6, it can be seen that the GPRS modem 46, which is now available as an "off-the-shelf" type component, is mounted in adjacent relationship with the battery 16, optionally to the alternate side of the PCB 28 on which the battery is mounted.

Figure 7:
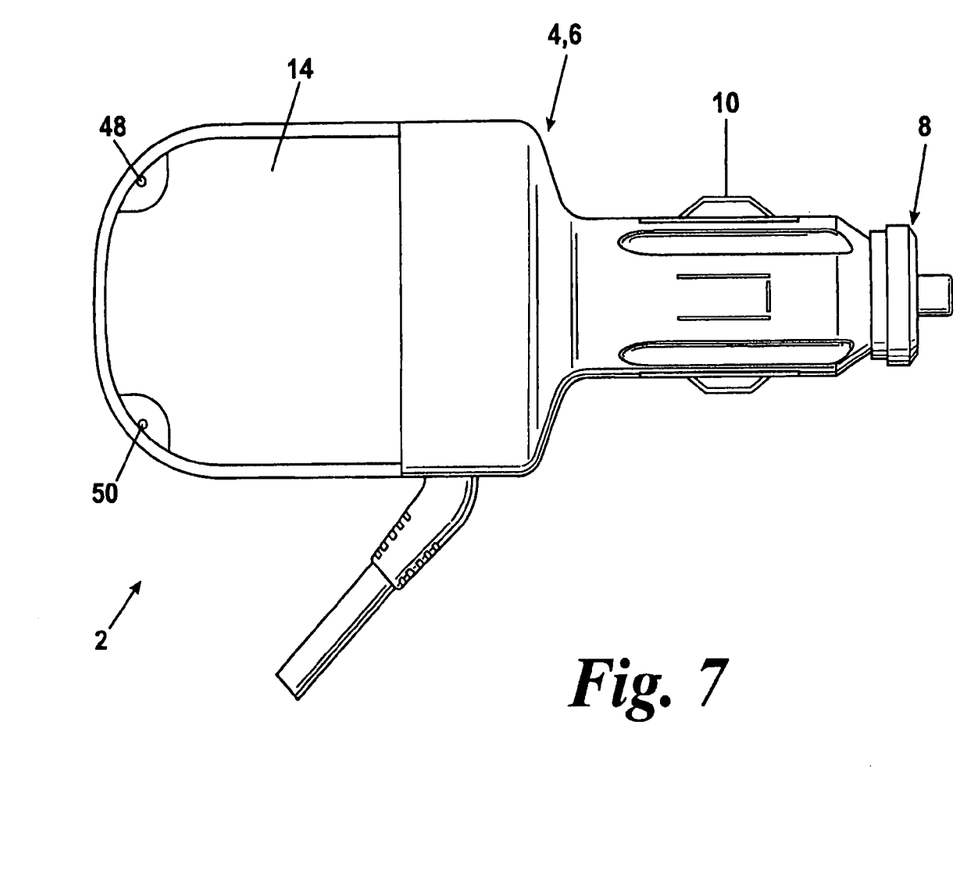
FIG. 7 shows a CLA in completed condition with LEDs visible at the rear.

The assembled CLA is shown in FIG. 7, and the LEDs 48, 50, are either made visible by virtue of the cover 14 having translucent or less opaque portions in the regions proximate the LED locations therewithin, or by having suitable apertures thereat.

In summary therefore, a cigarette lighter adapter (CLA) is disclosed comprising a body and a barrel portion extending therefrom, said barrel portion including first and second contacts respectively connectable within a vehicle cigarette lighter to be powered therefrom, said CLA being additionally provided with at least one primary electronic circuit within the body thereof, connected directly or indirectly to said contacts, and an output to which a power signal is capable of being delivered. The CLA is characterized in that it includes an antenna component in electrical communication with said primary electronic circuit, the latter delivering at least one of the antenna signal, an electronically processed version thereof, or data derived from the electronic processing thereof, to said output in conjunction with said power signal, the source of which is derived from said contacts or from an alternative power source provided within the body of said CLA, such as an on-board rechargeable battery, said power signal source further providing power to said primary electronic circuit to enable operation thereof. Further features include the provision of one or more secondary electronic circuits within the CLA to provide power management, regulation, control, switching, and/or battery re-charging functions, and the segregation of the primary and secondary electric circuits so as to ensure effective heat dissipation. Most preferably, the CLA is provided with vents adjacent which at least one of the secondary electronic circuits is provided.

What is claimed is:

1. A cigarette lighter adapter (CLA), comprising:
   a body,
   a barrel portion extending from said body, said barrel portion including first and second contacts arranged to be connected within and powered from a vehicle cigarette lighter,
   at least one primary electronic circuit arranged within said body and connected directly or indirectly to said contacts, said at least one primary electronic circuit operatively connected to at least one output arranged to receive a power signal,
   an antenna arranged within said body and in electrical communication with said at least one primary electronic circuit, the at least one primary electronic circuit configured to deliver at least one of an antenna signal, an electronically processed version of said antenna signal, and data derived from the electronic processing thereof via said output, to the at least one output in conjunction with the power signal, the power signal being received from the first and second contacts and also providing power to the primary electronic circuit,
   a rechargeable alternate power source arranged within said body and in electrical connection with said at least one primary electronic circuit thereby providing power to said circuit in the absence of power from the first and second contacts, and
   one or more secondary electronic circuits configured to provide at least one of power management, regulation, switching and recharging functions.

2. A CLA according to claim 1, wherein at least one of the secondary circuits is separate from the primary electronic circuit but in electrical communication therewith.

3. A CLA according to claim 1 wherein the alternate power source is an on-board source of power and is provided as an alternative to the source of power derived through the contacts.

4. A CLA according to claim 3 wherein at least one secondary electronic circuit is provided to implement a recharging function, said at least one secondary electronic circuit being in electrical communication with both said contacts and said on-board power source and re-charging the latter when a source of power is derived through the contacts.

5. A CLA according to claim 1 wherein at least one of the secondary electronic circuits includes a voltage switching regulator.

6. A CLA according to claim 1 wherein the primary electronic circuit is a wireless telecommunications protocol processing circuit.

7. A CLA according to claim 6 wherein the wireless telecommunications protocol circuit is adapted for at least one of the following wireless telecommunications protocols: GSM, GPRS, EDGE, HSDPA, CDMA, WCDMA, WiFi, WiMax, BLUETOOTH.

8. A CLA according to claim 1 wherein the primary electronic circuit is a wireless modem.

9. A CLA according to claim 1 wherein the CLA output is a cable in direct or indirect electrical communication with said primary electronic circuit.

10. A CLA according to claim 1 further provided with one or more LEDs indicative of at least one of: the charging of the on-board power source, the existence of a source of power for the CLA from a live vehicle cigarette lighter, and the processing of signals within the primary electronic circuit received by the antenna.

11. A CLA according to claim 10 wherein the CLA is provided with at least two LEDs, a first LED providing an indication of the existence of a source of power for the CLA, and a second LED for providing an indication of the processing of signals received by the antenna.

12. A CLA according to claim 11 wherein the LEDs are of different colours.

13. A CLA according to claim 1 wherein the primary electronic circuit is capable of amalgamating the antenna signal, an electronically processed version thereof, or a data signal derived therefrom, with said power signal, and delivering both in conjunction to said output.

14. A CLA according to claim 8 wherein the primary electronic circuit is a quad- or tri-band GPRS modem which is capable of extracting traffic congestion data from the signal received by the antenna.

15. A CLA according to claim 1 wherein the output is a serial output selected from one of: a USB socket or cable, a UART socket or cable.

16. A CLA according to claim 1 wherein a subscriber identity module (SIM) card connector is provided, in electrical communication with said primary electronic circuit whereby the CLA can automatically subscribe to, and thus process received wireless signals from a particular mobile telecommunications service provider when a suitably enabled SIM card is present in said connector.

17. A CLA according to claim 8 wherein the modem is capable of establishing a wireless connection using at least one of a subscriber identifier (IMSI), a modem identifier (IMEI), and an identified of a PND (PND UID).

18. A CLA according to claim 2 wherein one of the secondary electronic circuits provides a power control facility.

19. A CLA according to claim 1 wherein the antenna is a substantially flat planar antenna affixed inside the body of the CLA.

20. A CLA according to claim 1 further provided with vents in the body through which hot air, generated as a result of contact with the hot-working electronic circuit(s) and other electronic circuits, can escape.

21. A CLA according to claim 20, wherein the vents are provided toward the front of the body proximate the barrel portion of the CLA, said primary electronic circuit being provided towards the rear of the body, remote from the barrel portion, and said one or more secondary electronic circuits being also provided toward the front of the body of said CLA adjacent said vents.

22. A CLA according to claim 21 wherein the one more secondary electronic circuits is provided on a pair of Printed Circuit Boards (PCBs) disposed adjacent one another inside a forward portion of the body of the CLA, each said PCB being additionally disposed proximate a vent on the outside of the CLA.

23. A CLA according to claim 3 further provided with one or more LEDs indicative of at least one of: the charging of the on-board power source, the existence of a source of power for the CLA from a live vehicle cigarette lighter, and the processing of signals within the primary electronic circuit received by the antenna.

24. A CLA according to claim 1, further including a cover that slidingly fits over the body.

* * * * *